(12) United States Patent
Bouhal et al.

(10) Patent No.: US 9,313,042 B2
(45) Date of Patent: Apr. 12, 2016

(54) SELF-HEALING COMMUNICATIONS NETWORK

(75) Inventors: Abderrahim Bouhal, Roscoe, IL (US); Ricky J. Koch, Machesney Park, IL (US)

(73) Assignee: Schneider Electric Buildings, LLC, North Andover, MA (US)

(*) Notice: Subject to any disclaimer, the term of this patent is extended or adjusted under 35 U.S.C. 154(b) by 1048 days.

(21) Appl. No.: 13/275,472

(22) Filed: Oct. 18, 2011

(65) Prior Publication Data

US 2013/0094352 A1 Apr. 18, 2013

(51) Int. Cl.
H04L 12/26 (2006.01)
H04L 12/40 (2006.01)
H04L 12/437 (2006.01)

(52) U.S. Cl.
CPC ........ *H04L 12/40176* (2013.01); *H04L 12/437* (2013.01)

(58) Field of Classification Search
USPC .................................................. 370/225, 230
See application file for complete search history.

(56) References Cited

U.S. PATENT DOCUMENTS

| | | | |
|---|---|---|---|
| 5,442,623 A | 8/1995 | Wu | |
| 5,916,306 A | 6/1999 | Ruiz | |
| 2002/0152298 A1 | 10/2002 | Kikta et al. | |
| 2004/0153870 A1* | 8/2004 | Konz et al. | 714/47 |
| 2004/0160199 A1* | 8/2004 | Morgan et al. | 315/312 |
| 2004/0176877 A1 | 9/2004 | Hesse et al. | |
| 2006/0279398 A1* | 12/2006 | Wang | 340/3.42 |
| 2009/0037938 A1 | 2/2009 | Frank | |
| 2009/0271001 A1 | 10/2009 | Westphal et al. | |
| 2009/0287736 A1* | 11/2009 | Shike et al. | 707/103 R |
| 2009/0312853 A1 | 12/2009 | Kore et al. | |
| 2010/0324962 A1 | 12/2010 | Nesler et al. | |

FOREIGN PATENT DOCUMENTS

| | | |
|---|---|---|
| DE | 10324724 A1 | 12/2004 |
| EP | 0895899 A2 | 4/1998 |

(Continued)

OTHER PUBLICATIONS

Network guide by distech control, Jun. 2010.*
ZFR1800 Series Wireless Field Bus System; Product Bulletin; Jan. 4, 2010; 14 pages, 1-14; Software Release 5.0; Johnson Controls, Milwaukee, WI, USA.

(Continued)

*Primary Examiner* — Dang Ton
*Assistant Examiner* — Pamit Kaur
(74) *Attorney, Agent, or Firm* — Reinhart Boerner Van Deuren P.C.

(57) ABSTRACT

A self-healing communications network including a network bus that connects a plurality of field controllers. Each field controller is configured to operate an element of a system installed in a building or similarly large structure, and each is connected to the network bus. An end-of-line resistor can be automatically enabled in any field controller to designate that field controller as a terminal device on the network bus. In an embodiment, a parent controller detects each field controller on the network bus, and monitors and controls operation of the plurality of field controllers via commands transmitted over the network bus. The parent controller has first and second receiver/transmitter ports, both connected to the network bus. The parent controller is configured to automatically repair a break in the network bus by enabling at least one end-of-line resistor in one of the plurality of field controllers in order to properly terminate the network.

9 Claims, 1 Drawing Sheet

(56) References Cited

FOREIGN PATENT DOCUMENTS

| EP | 2001169 A1 | 5/2008 |
| WO | WO 2008/097992 A1 | 8/2008 |

OTHER PUBLICATIONS

MS/TP Communications Bus; Technical Bulletin; Oct. 4, 2010; 52 pages, 1-52; Software Release 5.1; Johnson Controls, Milwaukee, WI, USA.

Industrial Ethernet for Control and Automation; 2010 Product Brochure; 2010; 24 pages; Moxa Inc., Taiwan, Republic of China.

Nobuo Okabe; Issues of Control Networks When Introducing IP; Proceedings of the 2005 Symposium on Applications and the Internet Workshops; 2005; 4 pages; IEEE Computer Society, Washington, DC, USA.

H. Michael Newman; BACnet: Answers to Frequently Asked Questions; article; Oct. 1998; 13 pages.

VFD Solutions Variable Frequency Drive Products; catalog; Oct. 2007; 8 pages; Schneider Electric, Loves Park, Illinois, USA.

* cited by examiner

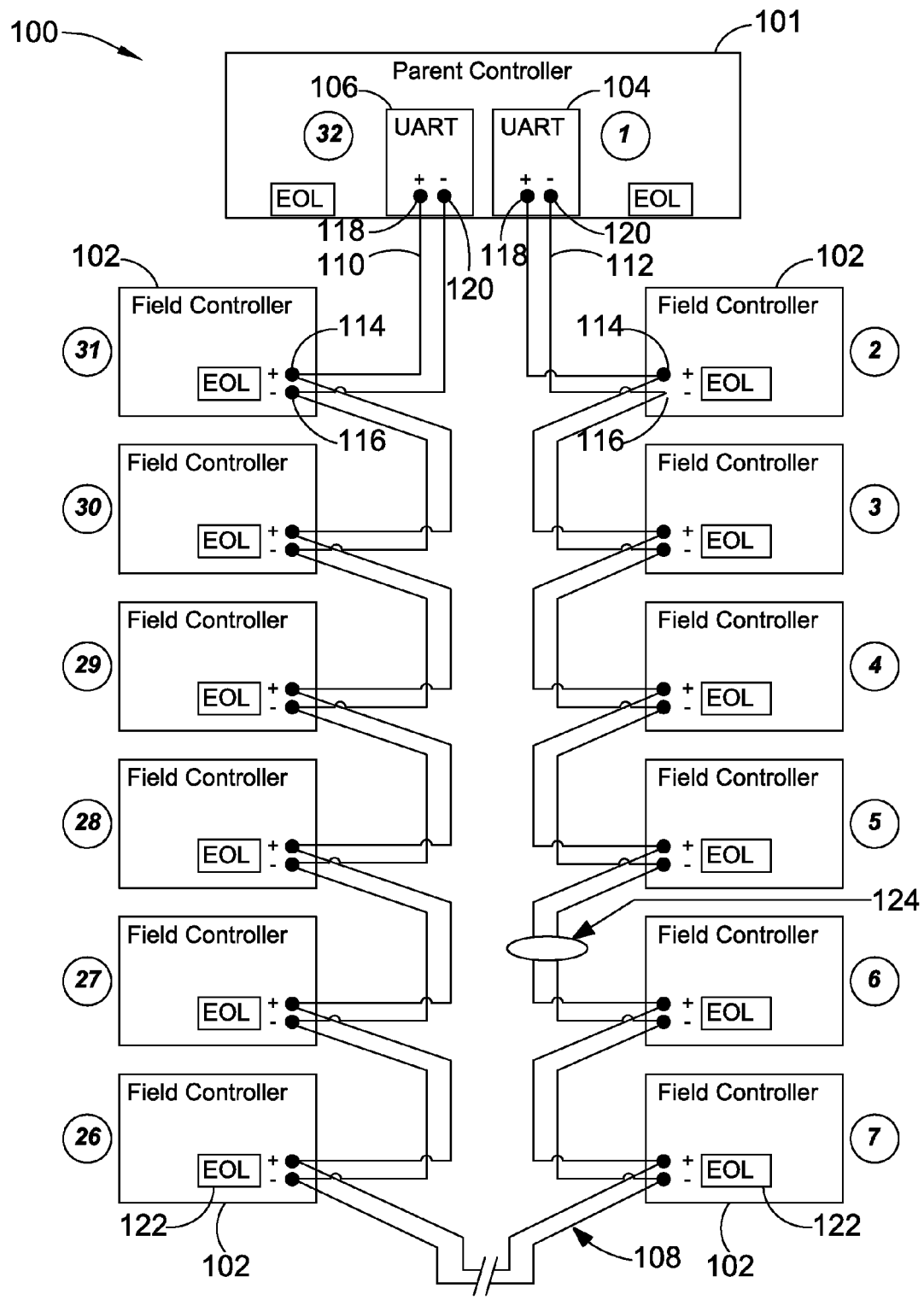

SELF-HEALING COMMUNICATIONS NETWORK

FIELD OF THE INVENTION

This invention generally relates to local area communications networks and, more specifically, to local area communications networks for building automation and control.

BACKGROUND OF THE INVENTION

Buildings and other similarly large structures, typically rely on computerized automation and control networks to operate the various environmental, safety, and security systems installed therein. Environmental systems include heating, ventilation, and air conditioning systems. Lighting control systems, access control systems, fire safety, surveillance and security systems may also be regulated by the aforementioned automation and control networks.

Often, the individual elements of these environmental, safety, and security systems are controlled by a device called a field controller. For example, each vent in a ventilation system may be controlled to open or close by a field controller. However, it is possible for a field controller to control multiple elements, for example two or three vents in a ventilation system. Similarly, in a lighting control system, a field controller may control the lighting for one room or a few rooms, or, in a heating system, a field controller may control the amount of heat supplied to one or more rooms. These individual field controllers are typically connected to higher-level controllers, thus allowing for centralized control of the field controllers.

In some operations, for example industrial operations, it is required to maintain control of the environmental conditions, or to maintain adequate security and/or access control at all times. For example, in buildings that house temperature-sensitive electronics, or in buildings in which certain sensitive chemical and/or biological processes are carried out, continuous maintenance and control of the temperature, humidity within a specific range may be required. Further, the constant availability of fire suppression systems and/or security systems may also be a prerequisite to maintenance of ongoing operations within the building. In conventional building automation and control networks, any damage to the network may render portions of the building's environmental or security systems inoperable.

Embodiments of the present invention provide an improvement over the current state of the art in automation and control networks. The advantages of these embodiments, as well as additional inventive features, will be apparent from the description of the invention provided herein.

BRIEF SUMMARY OF THE INVENTION

In one aspect, embodiments of the invention provide a self-healing communications network having a network bus. The network bus is configured to connect a plurality of field controllers. Each field controller is configured to operate an element of a system installed in a building or structure, and each field controller is connected to the network bus. An end-of-line resistor can be programmatically enabled in any particular field controller to designate that field controller as a terminal device on the network bus to properly terminate the network. In a particular embodiment, a parent controller is configured to detect each of the plurality of field controllers connected to the network. The parent controller has a first receiver/transmitter port and a second receiver/transmitter port. Each receiver/transmitter port is connected to the network bus, and configured to regulate operation of the plurality of field controllers via commands transmitted over the network bus. The first receiver/transmitter port is connected to a first end of the network bus, and the second receiver/transmitter port is connected to a second end of the network bus. The parent controller is configured to automatically detect a break in the network bus by reconfiguring the second receiver/transmitter, and is further configured to enable and disable the end-of-line resistor in one or more field controllers to repair the network bus.

In a particular embodiment of the invention, the first and second receiver/transmitter ports include universal asynchronous receiver/transmitter ports (UARTs), and communicate with the plurality of field controllers using a master-slave token-passing (MS/TP) system based on the EIA-485 standard, wherein the token-passing algorithm allows the parent controller to detect a break in the network bus. In a more particular embodiment, only one of the first and second receiver/transmitter ports is activated when there is no break in the network bus, and both the first and second receiver/transmitter ports are activated when there is a break in the network bus. In an even more particular embodiment, the self-healing communications network utilizes the BACnet communications protocol to facilitate communications between the devices connected to the network.

In certain embodiments of the invention, the network bus comprises twisted-pair wiring that includes a positive line and a negative line, and upon a break in the network bus, each receiver/transmitter port communicates with its own separate network of one or more field controllers. In other embodiments, upon a break in the network bus, the first and second receiver/transmitter ports form a bridge connection such that the plurality of field controllers function as a single network bus with no break therein. In a further embodiment, upon a break in the network bus, the parent controller disables the end-of-line resistor for a previously-designated terminal device on the network bus, and enables the end-of-line resistors in those field controllers located immediately on either side of the break in the network bus.

In a particular embodiment of the invention, each field controller includes one or more resistors that, when enabled, function as the end-of-line resistor, the parent controller is configured to enable or disable the one or more resistors for any field controller on the network bus.

In another aspect, embodiments of the invention provide a method of self-healing a communications network. The network has an parent controller configured to monitor and control the operation of a plurality of field controllers via control signals transmitted over a network bus. The parent controller is further configured to communicate over the network bus via a first receiver/transmitter port. In a particular embodiment, the first and second receiver/transmitter ports are terminal devices located at the two ends of the network bus. The method includes the steps of monitoring communications from each of the plurality of field controllers. The method further includes determining the number of field controllers connected to the network based on the monitored communications, and determining which of the plurality of field controllers is a terminal device on the network bus. The method also includes detecting when there is a break in the network bus. In a particular embodiment, the method includes modifying any of the plurality of field controllers to function as a terminal device on the network bus such that the parent controller retains the ability to monitor and control each of the plurality of field controllers. In a more particular embodiment of the invention, the method includes utilizing the BACnet communications protocol to facilitate communication between devices connected to the network.

Further, in certain embodiments of the invention, modifying any of the plurality of field controllers to function as a terminal device on the network bus includes modifying the field controllers located immediately on either side of the break in the network bus to function as terminal devices on the network bus. In a more particular embodiment, the method further includes providing the parent controller with a second receiver/transmitter port, and connecting the second receiver/transmitter port to the network bus, wherein the break in the network bus results in the first receiver/transmitter port communicating with each of the field controllers on one side of the break in the network bus, and the second receiver/transmitter port communicating with each of the field controllers on the other side of the break in the network bus. In an alternate embodiment of the invention, the method includes providing the parent controller with a second receiver/transmitter port, and connecting the second receiver/transmitter port to the network bus, wherein the break in the network bus results in the first receiver/transmitter port forming a bridge to the second receiver/transmitter port such that the self-healing communications network functions as a single network bus with no break therein.

In a particular embodiment of the invention, the method further includes installing a resistor configured to function as an end-of line resistor in each field controller, wherein modifying any of the plurality of field controllers to function as a terminal device on the network bus comprises causing the field controller being modified to connect its resistor across two polarized wires of the network bus, and wherein modifying any of the plurality of field controllers to function as the terminal device on the network bus further comprises causing the device previously functioning as a terminal device on the network bus to disconnect its resistor from the network bus.

In yet another aspect, embodiments of the invention provide a parent controller that includes a first receiver/transmitter port configured to communicate over a network bus, and a second receiver/transmitter port configured to communicate over the network bus. The parent controller further includes control logic circuitry coupled to the first and second receiver/transmitter ports. In particular embodiments, the control logic circuitry is configured to be connected to the network bus and further configured to detect a break in the network bus. In more particular embodiments, the control logic circuitry includes programmable elements configured to monitor and control a plurality of field controllers coupled to the network bus. After a break in the network bus is detected, the control logic circuitry is configured to automatically modify one or more of the plurality of field controllers such that the control logic circuitry retains the ability to monitor and control each of the plurality of field controllers.

In particular embodiments of the invention, the control logic circuitry is configured to transmit a first signal over the network bus that causes one of the plurality of field controllers to connect a resistor in that field controller across two wires of the network bus, the control logic circuitry being further configured to transmit a second signal over the network bus that causes the second receiver/transmitter port to disconnect a resistor in that second receiver/transmitter port from the network bus. In more particular embodiments, the control logic circuitry is further configured to initiate a master-slave token-passing scheme which allows the control logic circuitry to determine a number of field controllers connected to the network bus.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a schematic diagram of a self-healing communication network, constructed in accordance with an embodiment of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

FIG. 1 is a schematic diagram illustrating a self-healing communications network 100, also known as a communications trunk, constructed in accordance with an embodiment of the invention. The self-healing communications network 100 includes a plurality of field controllers 102, a parent controller 101 having a first receiver/transmitter port 104, and second receiver/transmitter port 106 all electrically linked by a network bus 108, which allows these various devices to communicate. In a particular embodiment, the parent controller 101 is a programmable device that includes control logic with one or more programmable elements. In an embodiment, the parent controller 101 uses the first and/or second receiver/transmitter ports 104, 106 to transmit command and control signals over the network bus 108 to monitor and control the operation of the plurality of field controllers 102. It should be noted however, that embodiments of the invention having both fewer and greater than two receiver/transmitter ports are envisioned.

Self-healing communications networks 100 may be used in various structures including, but not limited to, commercial and industrial buildings, and in similarly large structures. In an embodiment of the invention, the self-healing communications network 100 is configured to control various types of environmental, safety, and security equipment. For example, each field controller 102 may control one or several air vents, or water valves, such as those that are employed in heating or air conditioning systems, to regulate the flow rate therethrough. Field controllers 102 may also be used to control other types of heating and air conditioning units, security cameras, lighting systems, access control devices, and fire safety or fire suppression devices. Typically, each field controller 102 will control one or a small number of such devices. Thus, a building will typically employ a plurality of field controllers 102 networked together and centrally controlled.

In a particular embodiment, the self-healing communications network 100 uses the BACnet communications protocol. However, in alternate embodiments, other protocols may be employed. Typically in conventional BACnet receiver/transmitter communications networks, at each end of the network bus is a termination resistor, sometimes referred to as the end-of-line resistor, connected across the two polarized wires of the network bus. Termination resistors are used to prevent data corruption, and to reduce electrical noise sensitivity. In particular embodiments, the resistance value of the termination resistor is roughly equal to the bus line impedance. In the system shown in FIG. 1, when there is a break in the network bus 108, the first and second receiver/transmitter ports 104, 106, which are located at the two ends of the network bus 108, will typically their have end-of-line resistors 122 enabled (i.e., connected across the wires of the network bus 108).

BACnet is an ANSI/ASHRAE data communications protocol generally used for building automation and control networks. The BACnet protocol allows building operators to centrally control various systems throughout a building, including, but not limited to, heating, air conditioning, ventilation, lighting, access control, fire detection and suppression, security and surveillance. BACnet further allows for the sharing of information between systems, and provides a standardized model that allows for interoperability, that is, the connection of a variety of device-types from various manufacturers to the network. While many of the references herein are directed to the automation and control of building systems, one of ordinary skill in the art will recognize that the BACnet protocol may be used to control systems installed in other large structures.

BACnet supports a variety of physical layer networking protocols such as Arcnet, Ethernet, BACnet/IP, and Master-Slave/Token Passing (MS/TP) over EIA-485. In a particular embodiment of the invention, the components (e.g., drivers, receivers, transmitters) of the self-healing communication network 100 operate according to the EIA-485 (also known as RS-485) standard, and communicate using the BACnet communications protocol. Systems using the EIA-485 standard typically include a network bus made with two wires, or lines, which may be a polarized, a twisted-pair wiring arrangement for example, connecting a series of point-to-point multi-dropped devices. This arrangement allows for signals to be reliably transmitted over relatively long distances, wherein the standard typically allows for some devices 4,000 feet apart to operate effectively within the network.

In a particular embodiment of the invention, MS/TP is used to control access to the communications network 100, or trunk. In this embodiment, a device, such as a field controller 102, connected to the network bus 108 may initiate the transmission of a data frame only when it holds the token. A device holding the token is typically referred to as the master device. Both master and slave devices may transmit data frames in response to requests from a master device. However, slave devices only transmit when responding to a request from a master device. Typically, after sending no more than a predetermined number of data frames, and awaiting any expected replies, the master device passes the token on to the next device on the network bus. Generally, the token is passed from device to device in consecutive order starting with the device at the lowest address.

In an embodiment of the invention, such as that shown in FIG. 1, the plurality of field controllers 102 are daisy-chained with the positive line 110 of the network bus 108 connecting the positive terminals 114 of successive field controller 102, and the negative line 112 of the network bus 108 connecting the negative terminals 116 of successive field controllers 102. This arrangement of daisy-chained field controllers 102 is also referred to as a multi-drop installation. The parent controller 101 initiates communications with the field controllers 102 on the network bus 108. In at least one embodiment of the invention, during normal operation, the parent controller 101, via first receiver/transmitter port 104 controls all field controllers 102 on the network bus 108, while the second receiver/transmitter port 106 is inactive. In this embodiment, the second receiver/transmitter port 106 is activated when a break in the network bus 108 has been detected, or upon failure of the first receiver/transmitter port 104. A break in the network bus 108 could be the result of one or both of the lines 110, 112 being cut or damaged such that a signal could not be transmitted across the break in the network bus 108.

In a particular embodiment of the invention, the parent controller 101 is programmed to keep track of the number of field controllers 102 connected to the network bus 108. The parent controller 101 can determine which field controller 102 is the last field controller 102 in the daisy chain on the network bus 108 by monitoring the communications from the plurality of field controllers 102. In a particular embodiment, the parent controller 101 monitors the token passing of each of the plurality of field controllers 102 in the self-healing communications network 100, builds a list of Media Access Control (MAC) addresses and constantly compares that list against the list of field controllers 102 in its database.

In particular embodiments, when there is a break in the network bus 108, the parent controller 101 determines which of the plurality of field controllers 102 are no longer passing the token and identifies the first missing field controller 102 (i.e., undetected by parent controller 101) on the opposite side of the break. Generally, to repair the self-healing communications network 100 will require the enablement of a new terminal device and, in some cases, will require the disabling of a previous terminal device. To that end, in particular embodiments, a break in the network bus 108 causes the parent controller 101 to enable the second receiver/transmitter port 106 to act as a bridge to reestablish communication with the missing field controllers 102. The parent controller 101 also reconfigures the end-of-line termination accordingly, for example by enabling the end-of-line resistor 122 in one of the plurality of field controllers 102, thus configuring that field controller 102 as a terminal device on network bus 108. In certain embodiments, the parent controller 101 also disables the end-of-line resistor 122 in a previous terminal device, or in previous terminal devices (e.g., the first receiver/transmitter port 104, the second receiver/transmitter port 106, or both) on the network bus 108. As used in this application, "previous terminal device" refers to a device configured as a terminal device before the break in the network bus.

Referring again to FIG. 1, the self-healing communication network 100 has thirty-two devices—thirty field controllers 102 and two receiver/transmitter ports 104, 106—connected to network bus 108. However, alternate embodiments may include self-healing communication networks with greater or fewer than thirty-two devices. For the sake of simplicity, not all of the thirty field controllers 102 are shown in FIG. 1. The network bus 108 has a positive line 110 and a negative line 112. The positive line 110 is connected to the positive terminal 114 of each of the field controllers 102, and to the positive terminals 118 of the first and second receiver/transmitter ports 104, 106, while the negative line 112 is connected to the negative terminal 116 of each of the field controllers 102, and to the negative terminals 120 of the first and second receiver/transmitter ports 104, 106.

As stated above, each field controller 102 includes a resistor 122, that functions as an end-of-line resistor when connected to the network bus 108, thus allowing any field controller 102 to be configured as a terminal device. In most of the field controllers 102, meaning those that are not configured as a terminal device, this resistor 122 is disabled, that is, not connected across the two polarized lines 110, 112 of the network bus 108. However, first and second receiver/transmitter ports 104, 106 are configured to provide commands from the parent controller 101 over the network bus 108 which can cause any field controller 102 on the network bus 108 to enable its resistor 122, that is, cause the field controller 102 to connect the resistor 122 across the positive and negative lines 114, 116 of the network bus 108, so that the resistor 122 functions as an end-of-line resistor.

The resistors 122 in the first and second receiver/transmitter ports 104, 106 of the parent controller 101 serve the same purpose as the termination resistors 122 in the field controllers 102. In FIG. 1, the first and second receiver/transmitter ports 104, 106 of the parent controller 101 are shown as the first and last devices (i.e., the terminal devices) on the network bus 108, but the self-healing approach will also work if the parent controller 101 is located in the middle of the network bus 108. In the latter case, the termination resistors 122 in the first and second receiver/transmitter ports 104, 106 can be automatically controlled (in this case, disabled) by the parent controller 101 in the same manner as described for the field controllers 102.

As stated above, in certain embodiments of the invention, the parent controller 101 monitors the token-passing of each of the plurality of field controllers 102 on the network bus 108 to keep track of the number of functioning field controllers 102 on the network bus 108. In one example of token-passing as implemented by the self-healing communications network 100, the parent controller 101 initiates communication via the first receiver/transmitter port 104 over the network bus 108 and then passes the token to the nearest field controller 102. In FIG. 1, the nearest field controller 102 to first receiver/transmitter port 104 is designated as device number "2", and the last field controller 102 on the network bus 108 is designated as device number "31". In particular embodiments of the arrangement shown in FIG. 1, the terminal devices on the network bus 108 are the first and second receiver/transmitter ports 104, 106, meaning that, at least initially, these devices have their end-of-line resistors 122 enabled. The token is passed sequentially from field controller 102 to field controller 102. When the communication from the field controller 102 designated as device "31" is received, this indicates to the parent controller 101 that all field controllers 102 on the network bus 108 are functioning properly.

In the event of a break in the network bus 108, the parent controller 101 is programmed to determine the location of the break. FIG. 1 shows an example of a break 124 in the network bus 108 between field controllers 102 designated as device numbers "5" and "6". Continuing the example described above, in this case, the token could be passed no further than device number "5". Device number "5" would unsuccessfully attempt to pass the token to device number "6". The parent controller 101 is monitoring the token frames and will determine that device number "5" is still passing the token but device numbers "6" and beyond are not sending any token frames.

In a particular embodiment of the invention, the second receiver/transmitter port 106 is activated when the break 124 in the network bus 108 is detected. In at least one embodiment, two separate network buses are formed. The first receiver/transmitter port 104 communicates with a network bus consisting of field controllers 102 with device numbers "1" through "5", while the second receiver/transmitter port 106 communicates with a network bus consisting of field controllers 102 with device numbers "6" through "31". In doing so, the parent controller 101 would enable the resistors 122 in field controller 102 device numbers "5" and "6", such that these field controllers 102 function as terminal devices. Then these two newly-formed network buses would be operated separately by the parent controller 101 in a manner similar to that in which the single network bus 108 had been operating before the break 124.

In an alternate embodiment of the invention, when the break 124 in the network bus 108 after field controller 102 device number "5" occurs, the second receiver/transmitter port 106 is activated. In this embodiment, the first and second receiver/transmitter ports 104, 106 form a bridge connection such that the network bus 108 functions as a single network bus similarly to the way it functioned before the break 124. The newly-formed network bus has field controller 102 device number "5" at one end, and field controller 102 device numbers "6" at the other end. As a result, the first and second receiver/transmitter ports 104, 106 are located in a middle portion of the newly-formed network bus. The parent controller 101 would disable the end-of-line resistors 122 in the first and second receiver/transmitter ports 104, 106, as these devices are no longer terminal devices on the network bus 108. As in the previous example, the resistors 122 in field controller 102 device numbers "5" and "6" would be enabled, thus made to function as end-of-line resistors.

One particular mode of operation for the self-healing communications network 100 has been described hereinabove. However, other modes of operation are envisioned. For example, a self-healing network 100 having the same configuration as shown in FIG. 1 could be operated, at least initially, as two separate networks on network bus 108. In at least one embodiment, the system could have two networks of 15 field controllers 102 each. One network could include have field controllers 102 with device numbers "2" through "16" which receive communications via the first receiver/transmitter port 104, while the remaining 15 field controllers 102, with device numbers "17" through "31" receive communications via the second receiver/transmitter port 106. In this arrangement, field controller 102 device numbers "16" and "17" would be configured as terminal devices for their respective networks, with their resistors 122 coupled across the network bus 108.

In at least one embodiment, upon a break in the network bus 108, the parent controller 101 would disable the end-of-line resistors 122 in field controller 102 device numbers "16" and "17", and enable the end-of-line resistors 122 in the field controllers 102 on either side of the break in the network bus 108, allowing the self-healing communications network 100 to continue operating as one network bus 108 with two separate networks. In an alternate embodiment, the parent controller 101 would disable the end-of-line resistors 122 in field controller 102 device numbers "16" and "17", and form a bridge connection between the first and second receiver/transmitter ports 104, 106 and disable the end-of-line resistors 122 in the first and second receiver/transmitter ports 104, 106 so that the self-healing communications network 100 operates as a single network with no break therein.

One of skill in the art will recognize that the self-healing communication network 100 is configured to automatically detect and repair a break in the network bus 108 at any location along the network bus 108. Thus, a break in the network bus 108 between any of the thirty-two devices shown in FIG. 1 will be detected by the parent controller 101 and repaired as described above.

In particular embodiments of the invention, the parent controller 101 is programmed to provide the user with some type of notification upon detection of a break in the network bus 108. This notification may alert the system user via some type of alarm, audio or visual warning indicator, or electronic messaging, such as email or text message, when there is break in the network bus 108. Further, in a more particular embodiment, the parent controller 101 provides ways to handle transient requests to the missing field controllers 102.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A self-healing communications network comprising:
   a network bus configured to connect a plurality of field controllers, each field controller configured to operate an element of a system installed in a building, wherein each field controller is connected to the network bus, and wherein an end-of-line resistor can be enabled in any particular field controller to designate that field controller as a terminal device on the network bus; and
   a parent controller configured to detect each of the plurality of field controllers connected to the network, the parent controller having a first receiver/transmitter port and a second receiver/transmitter port, each connected to the network bus and configured to monitor and control operation of the plurality of field controllers via commands transmitted over the network bus, the first receiver/transmitter port connected to a first end of the network bus, the second receiver/transmitter port connected to a second end of the network bus, the parent controller further configured to automatically detect a break in the network bus, and further configured to repair the break in the network bus by enabling, when necessary, at least one end-of-line resistor in one of the plurality of field controllers to properly terminate the network;
   wherein only one of the first and second receiver/transmitter ports is activated when there is no break in the network bus;
   wherein the first and second receiver/transmitter ports are activated when there is a break in the network bus; and
   wherein, upon a break in the network bus, each receiver/transmitter port communicates with its own separate network of one or more field controllers.

2. A self-healing communications network comprising:
   a network bus configured to connect a plurality of field controllers, each field controller configured to operate an element of a system installed in a building, wherein each field controller is connected to the network bus, and wherein an end-of-line resistor can be enabled in any particular field controller to designate that field controller as a terminal device on the network bus; and
   a parent controller configured to detect each of the plurality of field controllers connected to the network, the parent controller having a first receiver/transmitter port and a second receiver/transmitter port, each connected to the network bus and configured to monitor and control operation of the plurality of field controllers via commands transmitted over the network bus, the first receiver/transmitter port connected to a first end of the network bus, the second receiver/transmitter port connected to a second end of the network bus, the parent controller further configured to automatically detect a break in the network bus, and further configured to repair the break in the network bus by enabling, when necessary, at least one end-of-line resistor in one of the plurality of field controllers to properly terminate the network;
   wherein only one of the first and second receiver/transmitter ports is activated when there is no break in the network bus;
   wherein the first and second receiver/transmitter ports are activated when there is a break in the network bus; and
   wherein, upon a break in the network bus, the first and second receiver/transmitter ports form a bridge connection such that the communications network functions as a single network bus having no break therein.

3. A method of self-healing a communications network which has a parent controller configured to monitor and control the operation of a plurality of field controllers via control signals transmitted over a network bus, the parent controller further configured to communicate over the network bus via a first receiver/transmitter port, the first receiver/transmitter port and the plurality of field controllers connected to the network bus, the method comprising the steps of:
   monitoring communications from each of the plurality of field controllers;
   determining the number of field controllers connected to the network bus based on the monitored communications, and determining which network device is a terminal device on the network bus;
   detecting when there is a break in the network bus;
   modifying any one of the plurality of field controllers to function as a terminal device on the network bus such that the parent controller retains the ability to monitor and control each of the plurality of field controllers; and
   installing a resistor configured to function as an end-of line resistor in each field controller, wherein modifying any of the plurality of field controllers to function as a terminal device on the network bus comprises causing the field controller being modified to connect its resistor across two polarized wires of the network bus.

4. The method of claim 3, wherein modifying any of the plurality of field controllers to function as a terminal device on the network bus further comprises causing the device previously functioning as a terminal device on the network bus to disconnect its resistor from the two polarized wires of the network bus.

5. A method of self-healing a communications network which has a parent controller configured to monitor and control the operation of a plurality of field controllers via control signals transmitted over a network bus, the parent controller further configured to communicate over the network bus via a first receiver/transmitter port, the first receiver/transmitter port and the plurality of field controllers connected to the network bus, the method comprising the steps of:
  monitoring communications from each of the plurality of field controllers;
  determining the number of field controllers connected to the network bus based on the monitored communications, and determining which network device is a terminal device on the network bus;
  detecting when there is a break in the network bus; and
  modifying any one of the plurality of field controllers to function as a terminal device on the network bus such that the parent controller retains the ability to monitor and control each of the plurality of field controllers;
wherein modifying any of the plurality of field controllers to function as a terminal device on the network bus comprises modifying the field controllers located immediately on either side of a break in the network bus to function as terminal devices on the network bus.

6. The method of claim 5, further comprising the step of providing the parent controller with a second receiver/transmitter port, and connecting the second receiver/transmitter port to the network bus, wherein a break in the network bus results in the first receiver/transmitter port communicating with the field controllers on one side of the break in the network bus, and the second receiver/transmitter port communicating with the field controllers on the other side of the break in the network bus.

7. The method of claim 5, further comprising the step of providing the parent controller with a second receiver/transmitter port, and connecting the second receiver/transmitter port to the network bus, wherein a break in the network bus results in the first receiver/transmitter port forming a bridge connection to the second receiver/transmitter port such that the parent controller retains the ability to monitor and control each of the plurality of field controllers.

8. A method of self-healing a communications network which has a parent controller configured to monitor and control the operation of a plurality of field controllers via control signals transmitted over a network bus, the parent controller further configured to communicate over the network bus via a first receiver/transmitter port, the first receiver/transmitter port and the plurality of field controllers connected to the network bus, the method comprising the steps of:
  monitoring communications from each of the plurality of field controllers;
  determining the number of field controllers connected to the network bus based on the monitored communications, and determining which network device is a terminal device on the network bus;
  detecting when there is a break in the network bus; and
  modifying any one of the plurality of field controllers to function as a terminal device on the network bus such that the parent controller retains the ability to monitor and control each of the plurality of field controllers;
  wherein detecting when there is a break in the network bus comprises detecting when there is a break in the network bus using a master-slave token-passing scheme; and
  further comprising the step of utilizing a BACnet communications protocol to facilitate communication between devices on the communications network.

9. A parent controller comprising:
  a first receiver/transmitter port configured to communicate over a network bus;
  a second receiver/transmitter port configured to communicate over the network bus; and
  control logic circuitry coupled to the first and second receiver/transmitter ports, the control logic circuitry configured to be connected to the network bus and further configured to detect a break in the network bus, wherein the control logic circuitry includes programmable elements configured to monitor and control a plurality of field controllers coupled to the network bus, and wherein, after the break is detected, the control logic circuitry is configured to automatically modify one or more of the plurality of field controllers such that the control logic circuitry retains the ability to monitor and control each of the plurality of field controllers;
  wherein the control logic circuitry is configured to transmit a first signal over the network bus that causes one of the plurality of field controllers to connect a resistor in that field controller across two wires of the network bus, the control logic circuitry being further configured to transmit a second signal over the network bus that causes the second receiver/transmitter port to disconnect a resistor in that second receiver/transmitter port from the network bus.

* * * * *